(12) United States Patent
Severance, Jr. et al.

(10) Patent No.: US 10,589,373 B2
(45) Date of Patent: Mar. 17, 2020

(54) VENTED PLASMA CUTTING ELECTRODE AND TORCH USING THE SAME

(71) Applicant: LINCOLN GLOBAL, INC., Santa Fe Springs, CA (US)

(72) Inventors: Wayne Stanley Severance, Jr., Darlington, SC (US); Praveen K. Namburu, Mount Plesant, SC (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 331 days.

(21) Appl. No.: 15/645,026

(22) Filed: Jul. 10, 2017

(65) Prior Publication Data

US 2019/0009356 A1 Jan. 10, 2019

(51) Int. Cl.
- *B23K 10/00* (2006.01)
- *H05H 1/34* (2006.01)
- *H05H 1/28* (2006.01)

(52) U.S. Cl.
CPC .............. *B23K 10/00* (2013.01); *H05H 1/28* (2013.01); *H05H 1/34* (2013.01); *H05H 1/341* (2013.01); *H05H 2001/3436* (2013.01); *H05H 2001/3468* (2013.01)

(58) Field of Classification Search
CPC . B23K 10/00; H05H 1/34; H05H 1/28; H05H 1/341; H05H 2001/3436; H05H 2001/3468
USPC ........ 219/121.39, 121.5, 121.51, 121.52, 75, 219/121.48
See application file for complete search history.

(56) References Cited

U.S. PATENT DOCUMENTS

| | | | |
|---|---|---|---|
| 4,590,354 A | 5/1986 | Marhic et al. | |
| 4,861,962 A | 8/1989 | Sanders | |
| 4,967,055 A * | 10/1990 | Raney ................. | H05H 1/3405 219/121.48 |
| 5,464,962 A | 11/1995 | Luo et al. | |
| 5,601,734 A | 2/1997 | Luo et al. | |
| 5,660,743 A | 8/1997 | Nemchinsky | |
| 5,695,662 A | 12/1997 | Couch, Jr. et al. | |
| 5,747,767 A | 5/1998 | Severence et al. | |
| 5,756,959 A | 5/1998 | Freeman et al. | |
| 5,767,478 A | 6/1998 | Walters | |
| 5,841,095 A | 11/1998 | Lu et al. | |
| 5,886,315 A | 3/1999 | Lu et al. | |
| 5,977,510 A | 11/1999 | Lindsay et al. | |
| 5,994,663 A | 11/1999 | Lu | |
| 6,020,572 A | 2/2000 | Marner et al. | |
| 6,066,827 A | 5/2000 | Nemchinsky | |

(Continued)

FOREIGN PATENT DOCUMENTS

| | | |
|---|---|---|
| DE | 102004049445 A1 | 4/2006 |
| DE | 202006018163 U1 | 3/2007 |

(Continued)

OTHER PUBLICATIONS

Extended European Search Report from Corresponding Application No. 18182656.1; dated Dec. 4, 2018; pp. 1-8.

*Primary Examiner* — Mark H Paschall
(74) *Attorney, Agent, or Firm* — Brad C. Spencer

(57) ABSTRACT

Embodiments of the present invention are directed to an air cooled cutting torch having improved performance. The torch comprises an improved electrode, where the electrode has at least one gas flow port to allow air flow to pass through the electrode to improve cooling and performance.

16 Claims, 8 Drawing Sheets

(56) References Cited

U.S. PATENT DOCUMENTS

| | | | |
|---|---|---|---|
| 6,084,199 A * | 7/2000 | Lindsay | B23K 10/00 |
| | | | 219/121.5 |
| 6,114,650 A | 9/2000 | Marner et al. | |
| 6,130,399 A | 10/2000 | Lu et al. | |
| 6,163,008 A | 12/2000 | Roberts | |
| 6,207,923 B1 | 3/2001 | Lindsay et al. | |
| 6,403,915 B1 * | 6/2002 | Cook | H05H 1/28 |
| | | | 219/121.51 |
| 6,423,922 B1 | 7/2002 | Nemchinsky et al. | |
| 6,424,082 B1 | 7/2002 | Hackett et al. | |
| 6,452,130 B1 | 9/2002 | Qian et al. | |
| 6,483,070 B1 | 11/2002 | Diehl et al. | |
| 6,614,001 B2 | 9/2003 | Hackett et al. | |
| 6,686,559 B1 | 2/2004 | Walters et al. | |
| 6,841,754 B2 | 1/2005 | Cook et al. | |
| 6,946,617 B2 | 9/2005 | Brandt et al. | |
| 6,969,819 B1 | 11/2005 | Griffin et al. | |
| 7,019,255 B2 | 3/2006 | Brandt et al. | |
| 7,081,597 B2 | 7/2006 | Severance, Jr. et al. | |
| 7,193,174 B2 | 3/2007 | Brandt et al. | |
| 7,256,366 B2 | 8/2007 | Severance et al. | |
| 7,375,302 B2 | 5/2008 | Twarog et al. | |
| 7,375,303 B2 | 5/2008 | Twarog et al. | |
| 7,423,235 B2 | 9/2008 | Severance, Jr. et al. | |
| 7,435,925 B2 | 10/2008 | Griffin et al. | |
| 7,598,473 B2 | 10/2009 | Cook et al. | |
| 7,605,340 B2 | 10/2009 | Duan et al. | |
| 7,659,488 B2 | 2/2010 | Cook et al. | |
| 7,754,993 B2 | 7/2010 | Ortega et al. | |
| 7,829,816 B2 | 11/2010 | Duan et al. | |
| 7,989,727 B2 | 8/2011 | Twarog et al. | |
| 8,035,055 B2 * | 10/2011 | Twarog | B23K 10/006 |
| | | | 219/121.41 |
| 8,089,025 B2 * | 1/2012 | Sanders | H05H 1/28 |
| | | | 219/121.49 |
| 8,097,828 B2 | 1/2012 | Roberts et al. | |
| 8,101,882 B2 | 1/2012 | Mather et al. | |
| D654,104 S | 2/2012 | Fitzpatrick et al. | |
| 8,115,136 B2 | 2/2012 | Mather et al. | |
| 8,153,927 B2 | 4/2012 | Twarog et al. | |
| 8,212,173 B2 | 7/2012 | Liebold et al. | |
| 8,304,684 B2 | 11/2012 | Smith et al. | |
| 8,338,740 B2 | 12/2012 | Liebold et al. | |
| 8,389,887 B2 | 3/2013 | Currier et al. | |
| 8,395,077 B2 | 3/2013 | Duan et al. | |
| 8,525,069 B1 | 9/2013 | Mather et al. | |
| 8,541,712 B2 | 9/2013 | Mather et al. | |
| D692,402 S | 10/2013 | Dalton et al. | |
| 8,546,718 B2 | 10/2013 | Mather et al. | |
| 8,546,719 B2 | 10/2013 | Warren, Jr. et al. | |
| 8,581,139 B2 | 11/2013 | Severance, Jr. et al. | |
| 8,633,417 B2 | 1/2014 | Ashtekar et al. | |
| 8,698,036 B1 | 4/2014 | Kornprobst et al. | |
| 8,759,709 B2 | 6/2014 | Mather et al. | |
| 8,772,667 B2 | 7/2014 | Yang et al. | |
| 8,829,385 B2 | 9/2014 | Yang et al. | |
| 2002/0185475 A1 | 12/2002 | Horner-Richardson et al. | |
| 2004/0169018 A1 | 9/2004 | Brasseur et al. | |
| 2005/0258151 A1 * | 11/2005 | Griffin | H05H 1/34 |
| | | | 219/121.52 |
| 2006/0163216 A1 | 7/2006 | Brandt et al. | |
| 2012/0012560 A1 | 1/2012 | Roberts et al. | |
| 2012/0145680 A1 | 6/2012 | Warren | |
| 2013/0043224 A1 * | 2/2013 | Leiteritz | H05H 1/34 |
| | | | 219/121.52 |
| 2013/0306607 A1 | 11/2013 | Mather et al. | |
| 2014/0021175 A1 | 1/2014 | Chen et al. | |
| 2014/0110382 A1 | 4/2014 | Beliveau et al. | |
| 2015/0351214 A1 * | 12/2015 | Patel | H05H 1/28 |
| | | | 219/121.49 |
| 2016/0050740 A1 | 2/2016 | Zhang | |
| 2016/0219688 A1 | 7/2016 | Carletti et al. | |

FOREIGN PATENT DOCUMENTS

| | | |
|---|---|---|
| EP | 0729805 A1 | 4/1996 |
| EP | 0790756 A2 | 8/1997 |
| FR | 2 839 606 A1 | 11/2003 |
| WO | 94/12308 A1 | 6/1994 |
| WO | 1999053734 A1 | 10/1999 |
| WO | 200028794 A1 | 5/2000 |
| WO | 2006113737 A2 | 10/2006 |
| WO | 2008101226 A1 | 2/2008 |
| WO | 2010111695 A1 | 9/2010 |
| WO | 2012118826 A1 | 9/2012 |
| WO | 2014187438 A1 | 11/2014 |
| WO | 2016/046622 A1 | 3/2016 |
| WO | 2018/071010 A1 | 4/2018 |

* cited by examiner

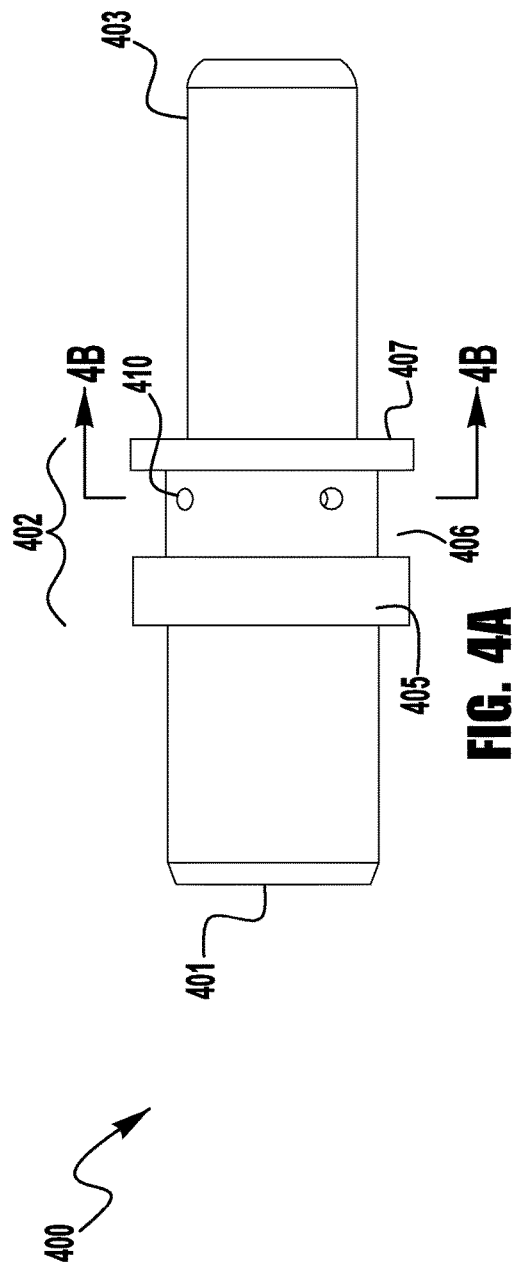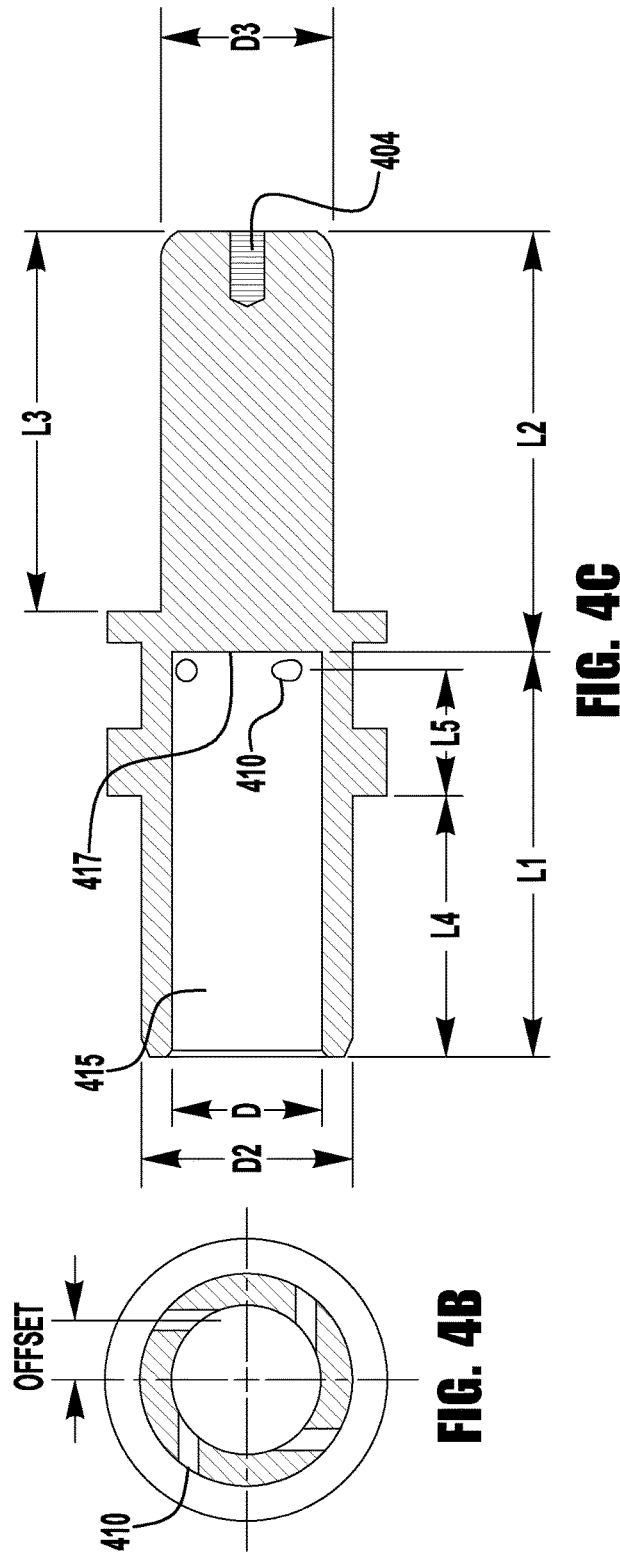

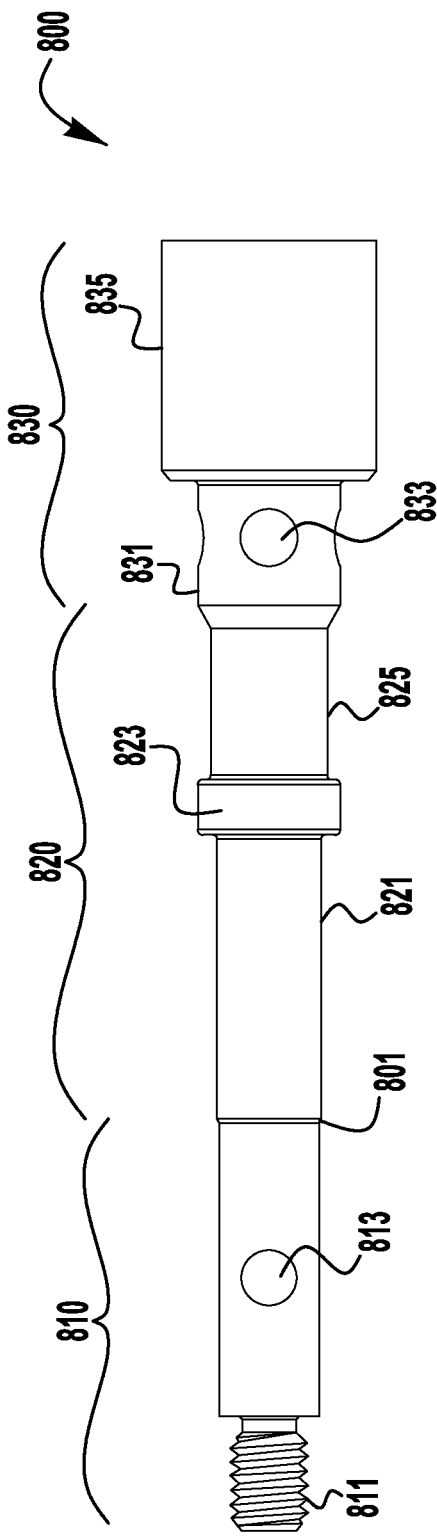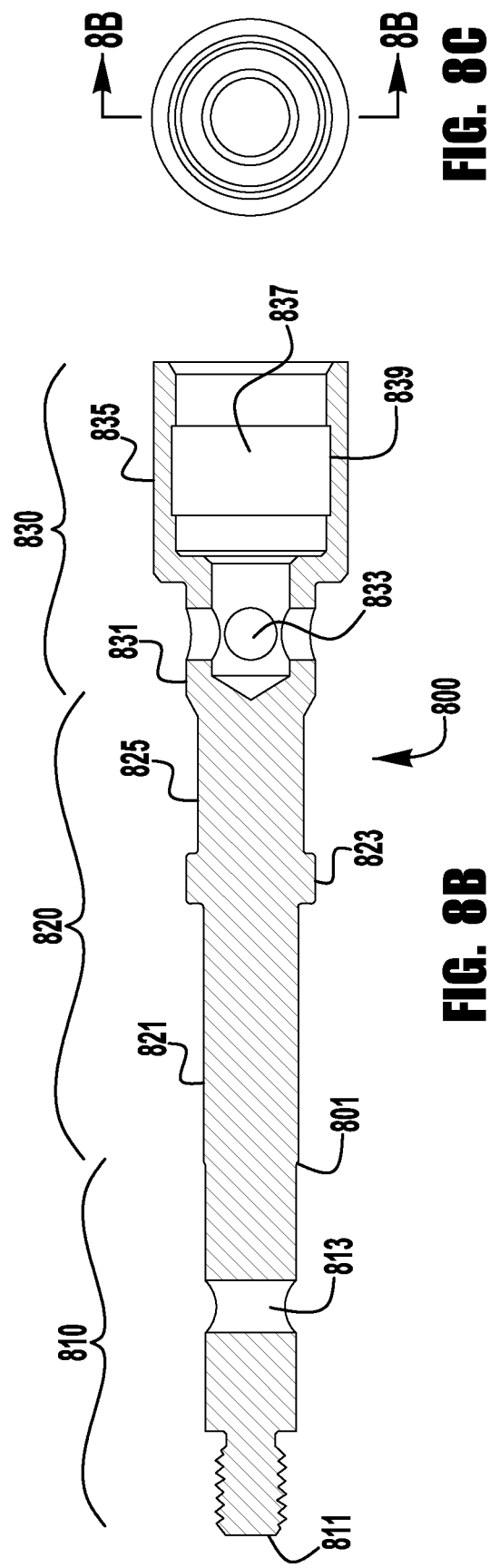

VENTED PLASMA CUTTING ELECTRODE AND TORCH USING THE SAME

TECHNICAL FIELD

Devices, systems, and methods consistent with the invention relate to cutting, and more specifically to devices, systems and methods related to plasma arc cutting torches and components thereof.

BACKGROUND

In many cutting, spraying and welding operations, plasma arc torches are utilized. With these torches a plasma gas jet is emitted into the ambient atmosphere at a high temperature. The jets are emitted from a nozzle and as they leave the nozzle the jets are highly under-expanded and very focused. However, because of the high temperatures associated with the ionized plasma jet many of the components of the torch are susceptible to failure. This failure can significantly interfere with the operation of the torch and prevent proper arc ignition at the start of a cutting operation. Thus cooling of torch components can be very important.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention is an air cooled plasma torch having and components thereof that are designed to optimize performance and durability of the torch. Specifically, exemplary embodiments of the present invention include a vented electrode and a torch including the vented electrode.

BRIEF DESCRIPTION OF THE DRAWINGS

The above and/or other aspects of the invention will be more apparent by describing in detail exemplary embodiments of the invention with reference to the accompanying drawings, in which:

FIGS. 4A-4C are diagrammatical representations of an exemplary embodiment of an electrode of the present invention;

FIGS. 8A-8C are a diagrammatical representations of an exemplary cathode of the present invention.

DETAILED DESCRIPTION

Figure 1:
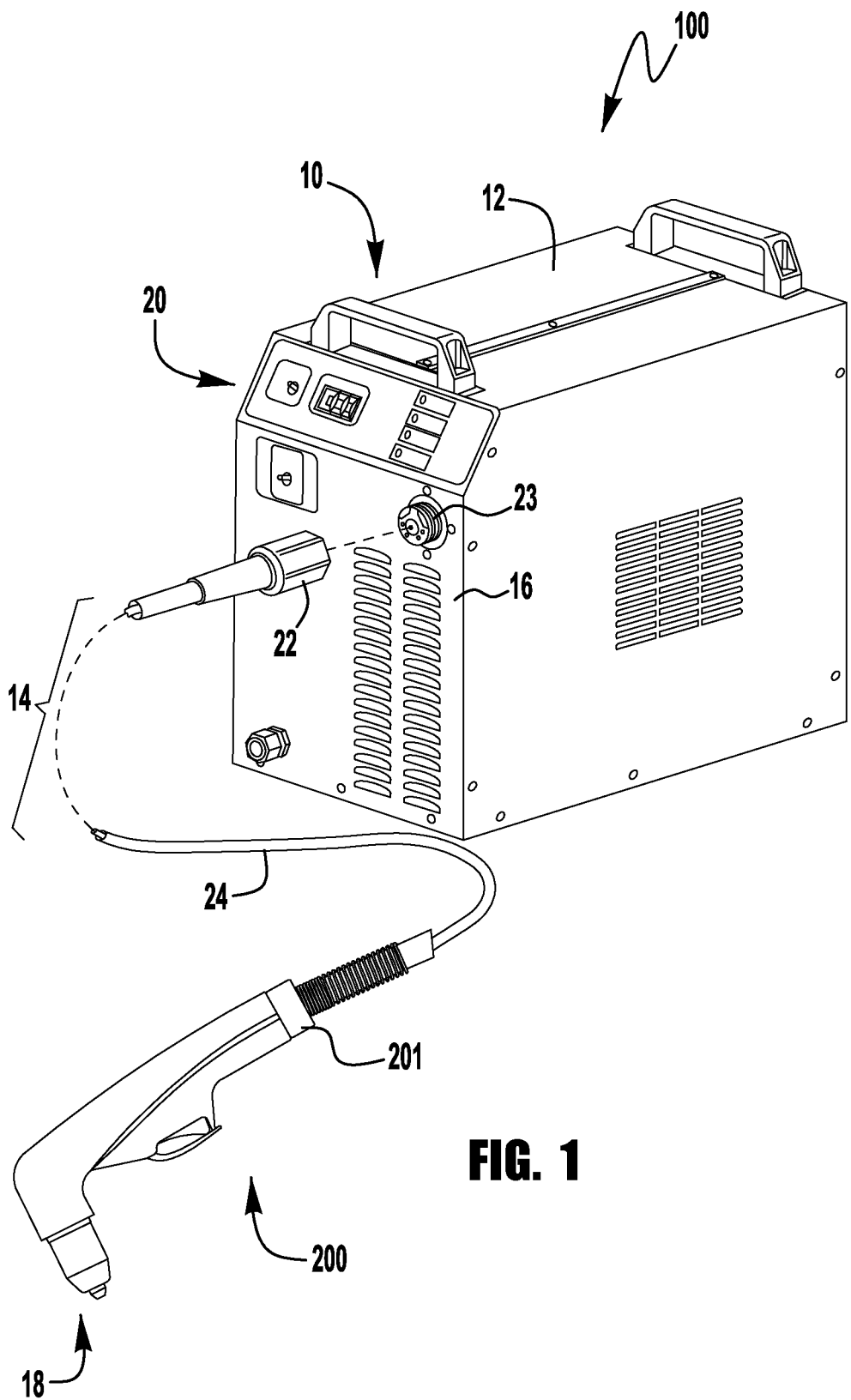
FIG. 1 is a diagrammatical representation of an exemplary cutting system which can be used with embodiments of the present invention.

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The present disclosure is generally directed to air cooled plasma arc torches useful various cutting, welding and spraying operations. Specifically, embodiments of the present invention are directed to air cooled plasma arc torches. Further exemplary embodiments are directed to air cooled plasma arc torches which are retract arc torches. As generally understood, retract arc torches are torches where the electrode is in contact with the nozzle for arc initiation and then the electrode is retracted from the nozzle so that the arc is then directed through a throat of the nozzle. In other types of retract torches, the electrode stays stationary and the nozzle is moved. Embodiments of the present invention apply to both types. Additionally, embodiments of the present invention can also be used with high frequency start torches, and the like. The construction and operation of these torches are generally known, and thus their detailed construction and operation will not be discussed herein. Further, embodiments of the present invention can be used in either handheld or mechanized plasma cutting operations. It should be noted that for purposes of brevity of clarity, the following discussion will be directed to exemplary embodiments of the present invention which are primarily directed to a hand held plasma torch for cutting. However, embodiments of the present invention are not limited in this regard and embodiments of the present invention can be used in welding and spraying torches without departing from the spirit or scope of the present invention. Various types and sizes of torches are possible at varying power levels if desired. For example, exemplary embodiments of the present invention can be used on cutting operation that utilize a cutting current in the range of 40 to 100 amps, and can cut workpieces having a thickness of up to 0.075 inches, and in other embodiments can cut workpieces of a thickness of up to 1.5 inches. Further, the torches and components described herein could be used for marking, cutting or metal removal. Additionally, exemplary embodiments of the present invention, can be used with varying currents and varying power levels. The construction and utilization of air flow and cooling systems of the type that can be used with embodiments of the present invention are known and need not be discussed in detail herein.

Turning now to FIG. 1, an exemplary cutting system 100 is shown. The system 100 contains a power supply 10 which includes a housing 12 with a connected torch assembly 14. Housing 12 includes the various conventional components for controlling a plasma arc torch, such as a power supply, a plasma starting circuit, air regulators, fuses, transistors, input and output electrical and gas connectors, controllers and circuit boards, etc. Torch assembly 14 is attached to a front side 16 of housing 12. Torch assembly 14 includes within it electrical connectors to connect an electrode and a nozzle within the torch end 18 to electrical connectors within housing 12. Separate electrical pathways may be provided for a pilot arc and a working arc, with switching elements provided within housing 12. A gas conduit is also present within torch assembly to transfer the gas that becomes the plasma arc to the torch tip, as will be discussed later. Various user input devices 20 such as buttons, switches and/or dials may be provided on housing 12, along with various electrical and gas connectors.

It should be understood that the housing 12 illustrated in FIG. 1 is but a single example of a plasma arc torch device that could employ aspects of the inventive the concepts disclosed herein. Accordingly, the general disclosure and description above should not be considered limiting in any way as to the types or sizes of plasma arc torch devices that could employ the disclosed torch elements.

As shown in FIG. 1, torch assembly 14 includes a connector 22 at one end for attaching to a mating connector 23 of housing 12. When connected in such way, the various electrical and gas passageways through the hose portion 24 of torch assembly 14 are connected so as to place the relevant portions of torch 200 in connection with the relevant portions within housing 12. The torch 200 shown in FIG. 1 has a connector 201 and is of the handheld type, but as explained above the torch 200 can be of the mechanized type. The general construction of the torch 200, such as the handle, trigger, etc. can be similar to that of known torch constructions, and need not be described in detail herein. However, within the torch end 18 are the components of the torch 200 that facilitate the generation and maintenance of the arc for cutting purposes, and some of these components will be discussed in more detail below. Specifically, the some of the components discussed below, include the torch electrode, nozzle, shield and swirl ring.

Figure 2:
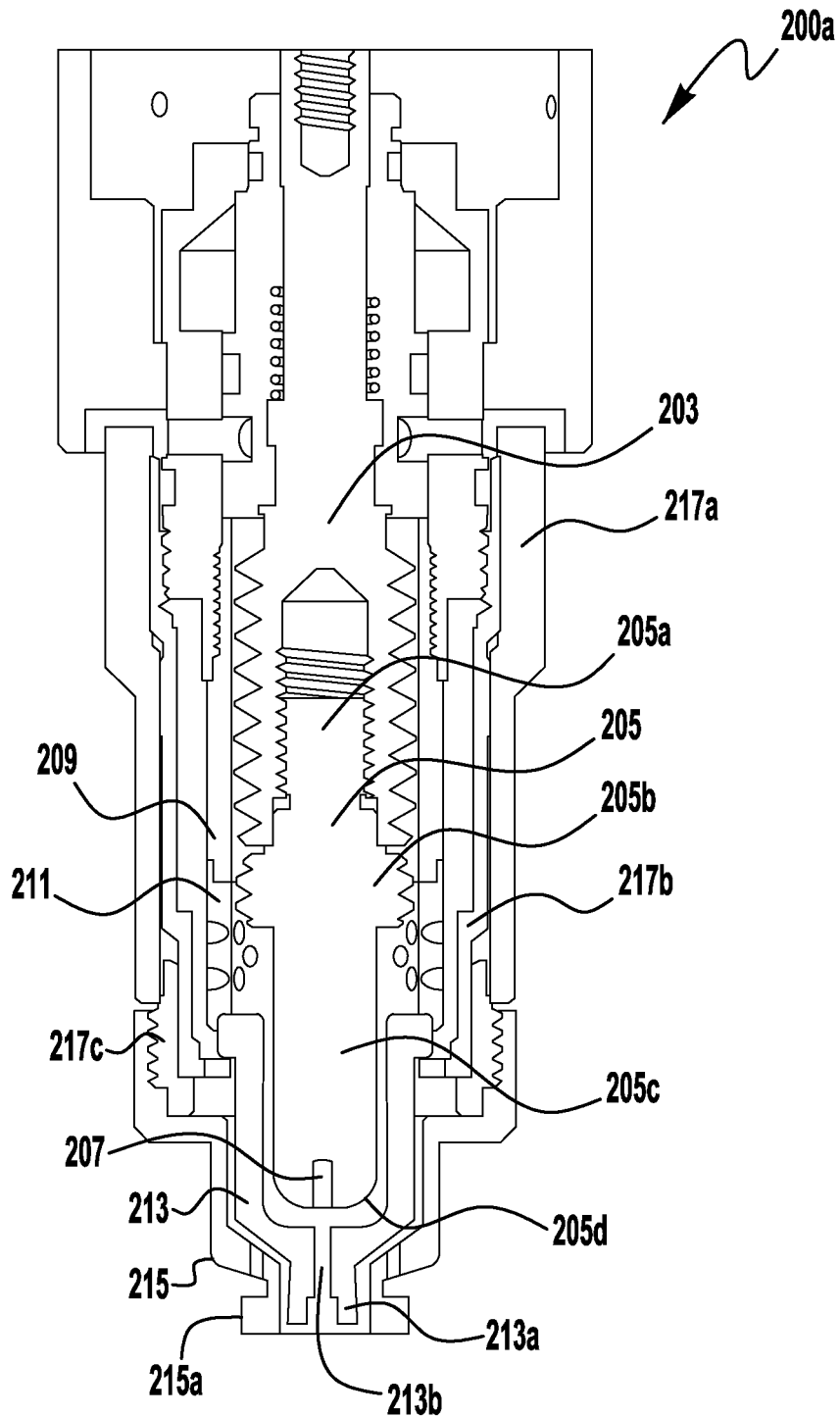
FIG. 2 is a diagrammatical representation of a portion of the head of a torch utilizing known components.

FIG. 2 depicts the cross-section of an exemplary torch head 200a of a known construction. It should be noted that some of the components of the torch head 200a are not shown for clarity. As shown, the torch 200a contains a cathode body 203 to which an electrode 205 is electrically coupled. The electrode 205 is inserted into an inside cavity of a nozzle 213, where the nozzle 213 is seated into a swirl ring 211 which is coupled to an isolator structure 209 which isolates the swirl ring, nozzle etc. from the cathode body 203. The nozzle 213 is held in place by the retaining cap assembly 217a-c. As explained previously, this construction is generally known.

As shown, the electrode 205 has a thread portion 205a which threads the electrode 205 into the cathode body 203. The electrode 205 also has a center helical portion 205b. The helical portion 205b has a helical coarse thread-like pattern which provides for flow of the air around the section 205b. However, because of this section special tooling is required to remove the electrode 205 from the cathode body 203. Downstream of the center portion 205b is a cylindrical portion 205c, which extends to the distal end 205d of the electrode 205. As shown, the cylindrical portion is inserted into the nozzle 213, such that the distal end 205d is close to the throat 213b of the nozzle 213. The cylindrical portion can include a flat surface at the center portion 205b so that a specialized tool can grab the electrode 205 to remove it from the cathode body. Typically, the transition from the cylindrical portion 205c to the distal end 205d includes a curved edge leading a flat end face on the distal end 205d. In a retract start torch this flat end face is in contact with the inner surface of the nozzle 213 to initiate the arc start. Once the arc is ignited the electrode 205 is retracted and a gap is created between the electrode 205 and the nozzle 213 (as shown), at which time the plasma jet is directed through the throat 213b of the nozzle 213 to the workpiece. It is generally understood, that with this configuration, known electrodes 205 can begin to fail during arc initiation after about 300 arc starts. Typically, the electrode 205 is chrome or nickel plated to aid in increasing the life of the electrode 205. Once this event begins to occur, the electrode 205 may need to be replaced.

Also, as shown a hafnium insert 207 is inserted into the distal end 205d of the electrode 205. It is generally known that the plasma jet/arc initiates from this hafnium insert 207, which is centered on the flat surface of the distal end 205d.

As briefly explained above, the torch 200a also includes a nozzle 213 which has a throat 213b threw which the plasma jet is directed during cutting. Also, as shown the nozzle 213 contains a cylindrical projection portion 213a through which the throat 213b extends. This projection portion 213a provides for a relatively long throat 213b and extends into an cylindrical opening in the shield 215, which also has a cylindrical projection portion 215a. As shown, and air flow gap is created between each of the projection portions 213a/215a to allow a shielding gas to be directed to encircled the plasma jet during cutting. In air cooled torches, each of these respective projection portions 213a/215a direct the plasma jet and shield gas to the cutting operation. However, because of the geometry of each of the nozzle 213 and the shield cap 215, these projection portions can tend to heat up significantly. This heat can cause the heat band on the nozzle 213 to extend significantly along its length. This increased heat band and high heat can cause the components to deteriorate and fail, causing the need for replacement. Further, their performance can degrade over time which can cause less than optimal cutting results. Therefore, improvements are needed for known air cooled torch configurations.

Figure 3:
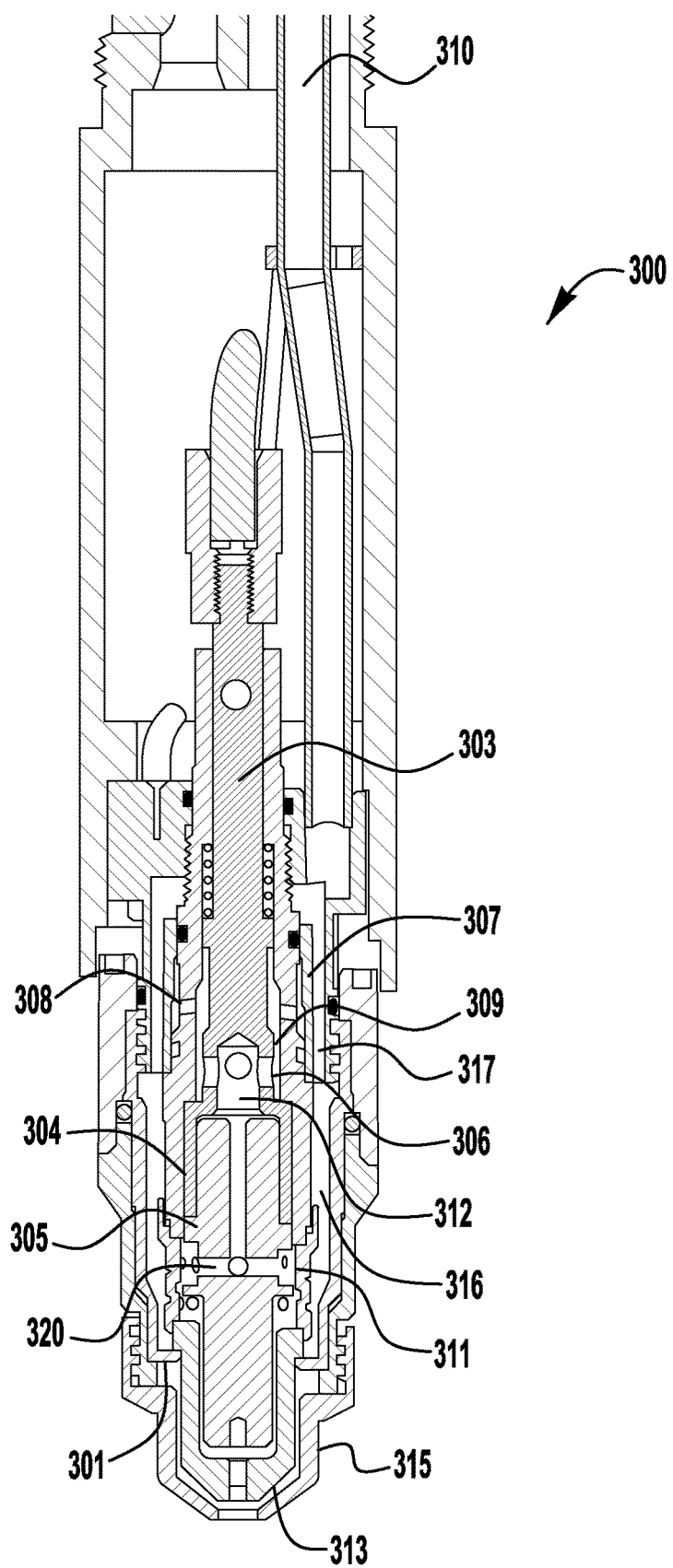
FIG. 3 is a diagrammatical representation of a portion of the head of an exemplary embodiment of a torch of the present invention.

Turning now to FIGS. 3 (and FIG. 7), an exemplary embodiment of a torch head 300 is shown. The torch head 300 can be used in the torch 200 shown in FIG. 1, and like FIG. 2, not all of the components and structure is shown to simplify the Figure (for example, handle, outer casing, etc.). Further, in many respects (except those discussed below) the construction and operation of the torch head 300 is similar to known torch heads, such that all of the details of its construction need not be discussed herein. However, as will be explained in more detail below, the electrode 305 is constructed differently than known electrode constructions. As shown, the torch includes a nozzle 313, shield cap 315 and swirl ring 311, consistent with known torches. Further, like the torch 200a in FIG. 2, the torch 300 in FIG. 3 is an air cooled, retract-type torch. Further understanding of exemplary embodiments of the present invention is provided in the discussions below, in which further embodiments of the electrode are discussed. As shown, and consistent with known torches, the electrode 305 is coupled to a cathode body (or piston) 303 which moves together with the electrode 305 during operation. The electrode 305 is coupled to the cathode body 303 via a cavity portion 304 on the cathode body 303 which can have a multi-lam engagement structure, or other similar or known method of securing the electrode and the cathode body.

Figure 7:
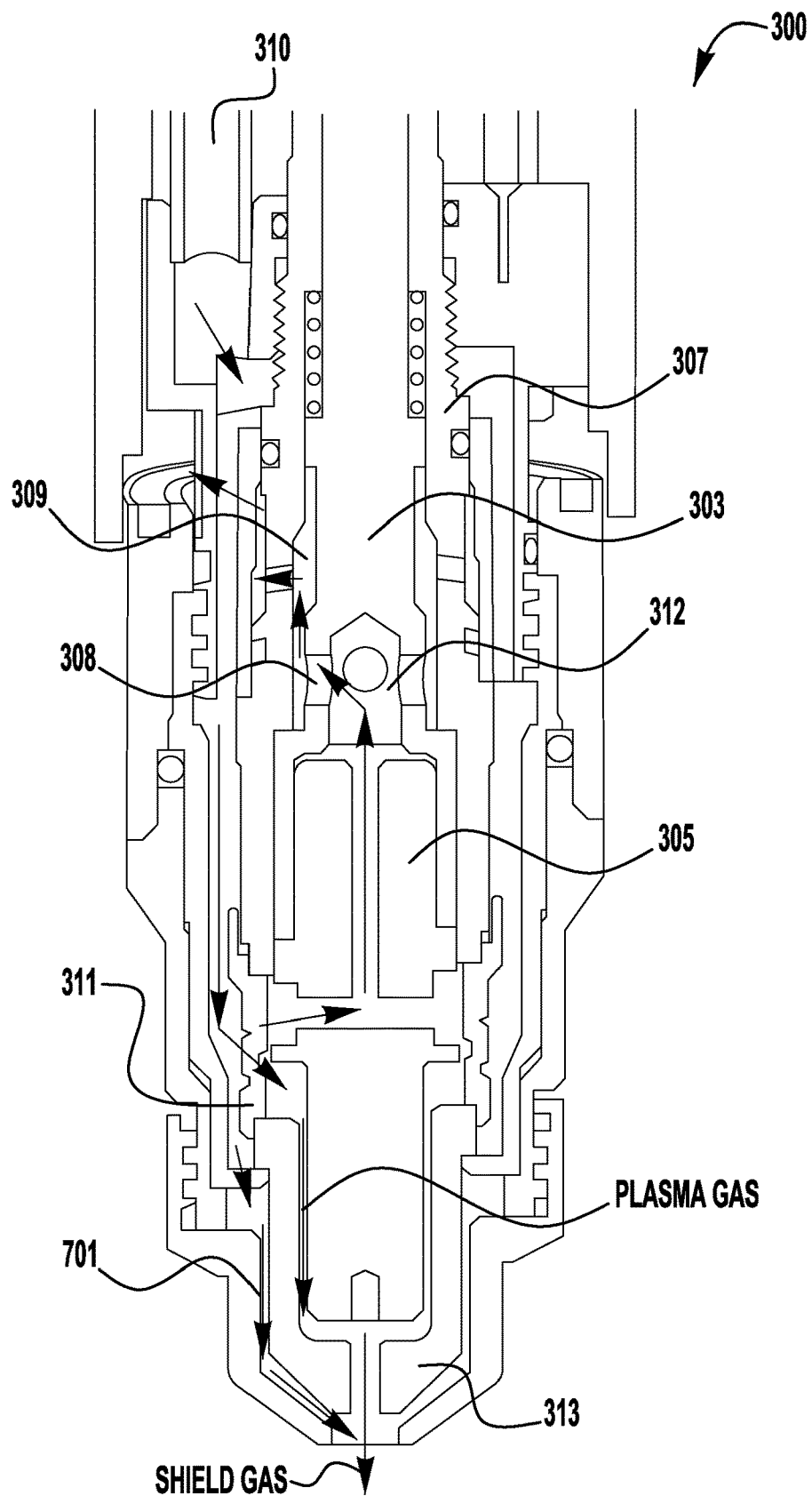
FIG. 7 is a diagrammatical representation of an exemplary flow path in an embodiment of the present invention.

Also, as shown and as used in known torches, an insulator 307 is used to provide electrical isolation of the cathode/electrode from other torch components. The insulator 307 has a plurality of vent holes 308 which allow gas/air to exit from a cavity 309 between the insulator 307 and the cathode body 303. To further understand the gas flow of embodiments of the invention, FIG. 7 can also be referenced. As shown, the gas/air can enter the torch 300 via a conduit 310 and is directed to a shield gas path 701 as shown in FIG. 7

(consistent with known torches and torch configurations) and in through an air passage 317 and then to a plenum 316. Some of the gas flow is then directed out of the retaining cap that is used to hold the nozzle in place and that gas is directed out of the torch as shield gas. The retaining cap can have gas flow ports to allow the gas to flow as depicted. The other amounts of the gas enters the swirl ring 311 as shown. After the gas passes through the swirl ring 311 some of the gas is used to pass between the electrode 305 and the nozzle 313 and a portion of the gas enters the electrode 305 via the ports. The portions 405 and 407 on the electrode (see FIGS. 4A and 4C) aid in directed flow into the ports of the electrode. As shown, the gas that entered the ports 320 passes up through the upstream end of the electrode 305 and enters a cavity 312 in the cathode body 303, where it exits the ports 306 into the cavity 309. The gas is then directed to the ports 308 in the insulator 307, where it is then vented from the torch 300. As shown in FIGS. 3 and 7, in exemplary embodiments the ports 308 in the insulator and the ports 306 on the cathode body are not aligned. That is, they are not positioned at the same plane—along the length of the torch 300. In such embodiments, this ensures that the flow of gas/air passes over surfaces of the cathode body 303 to enhance the thermal exchange/cooling of the cathode body 303. The flow through the electrode 305, through the ports 320 provide additional cooling of the electrode and can enhance the overall operation of the electrode and the torch. Also, as shown, in some embodiments, the torch can also include a nozzle retaining cup 301 which is used to hold the nozzle 313 in place. In exemplary embodiments, the retaining cup 301 also has shield gas holes/ports to allow the flow of shield gas through the retaining cup 301. In exemplary embodiments, these holes/ports are positioned out of plane with the gas flow path between the nozzle and the electrode. That is, the ports in the retaining cap are at a further radial distance from the center of the torch than the path between the electrode and the nozzle as shown. In other exemplary embodiments, not shown, rather than (or in addition to) having the gas flow ports in the retaining cap flow/vent ports can be positioned in the nozzle, such that the shield gas can be oriented/flowed either in line or out of line with the plasma gas path.

With the above configuration, embodiments of the present invention enhance the cooling and operation of air cooled plasma cutting torches. As briefly discussed above, existing torches can suffer from inadequate electrode cooling. For example, in some types of single gas, gas cooled, blowback starting, plasma arc cutting torches the electrode is connected to a cathode/piston. In the absence of a supply of gas/air, a spring drives the piston/cathode towards the nozzle so that the nozzle and electrode are in contact. When air/gas is supplied, the pressure of the air drives the piston and electrode away from the nozzle thereby initiating a pilot arc. In some embodiments, the piston may be actuated and the electrode cooled by the total incoming gas flow. However, in some known torch configurations only a portion of the gas/air flow is used to cool the electrode. In these configurations, this gas flow is vented from the torch. In further known configurations cooling of the electrode is often obtained by machining fins in the form of a screw thread on the outside of the electrode through which the vented gas must flow. However, machining threads on the OD of an electrode necessarily increases the diameter needed for the electrode.

Alternatively, in other designs the piston/cathode may be directly cooled by the vented gas and the electrode indirectly cooled by contact with the piston/cathode. This contact is obtained by screwing the electrode into the piston/cathode to increase contact surface area. This contact is also used to conduct electricity into the electrode. However, at higher currents and duty cycles, the electrode/piston connection will loosen and $I^2R$ heating at the connection will greatly increase. This can result in welding of the electrode to the piston and the loss of the torch body.

These issues are addressed in embodiments of the present invention, where the vent gas is directed through the electrode as described above. As will be described further below, various forms of passageways can be devised to maximize cooling and electrode operation while minimizing machining costs. Embodiments of the present invention can be used while retaining the threaded connection between the piston/cathode and electrode, or using a press-fit connection, or any other connection methodology.

Additionally, embodiments of the present invention can offer an additional means to control the flow of vent gas from the torch. As will be explaining below, in some embodiments a flow controlling orifice is built into the electrode, which can be used to control the vent gas flow at a rate appropriate for a given cutting operation, e.g., low current or high current cutting processes.

Embodiments of the present invention can also alleviate issues that can stem from arcing within the nozzle chamber as a consequence of complete or partial blockage of the nozzle orifice. This arcing may occur because of electrode failure or a cutting error such as piercing with the torch in contact with the workpiece. In the event of such an occurrence, the flow of plasma gas through the nozzle orifice can be significantly diminished or blocked all together. If an arc exists between the electrode and the nozzle during these events, there is no force acting on the arc to keep it in the nozzle chamber. Buoyancy forces, as with a Jacob's ladder, can cause the arc to climb into the annulus between the electrode and swirl baffle. While there the arc can heat the vent gas flowing between the piston/cathode and torch body insulator causing damage to these parts. As described with embodiments herein, this damage can be avoided or minimized by placing a ridge on the electrode so that, acting in combination with the location of the gas inlet holes on the swirl baffle, the plasma gas and vent gas flows are largely isolated from one another. This effect could also be obtained by placing a ridge on the gas swirl baffle instead or in addition to a ridge on the electrode.

Turning now to FIGS. 4A through 4C, an exemplary electrode 400 is shown. It is noted for purposes of clarity that the electrode 400 can be substituted for the electrode 305 shown in FIG. 3. As shown in FIG. 4A, the electrode 400 is comprised of three portions, an upstream portion 401, a body portion 402 and a distal end portion 403. The electrode 400 can be made of any known material for cutting electrodes, including copper, silver, etc. or a combination thereof. Also, as with known electrodes, the electrode 400 has a hafnium insert 404 (or similar material) in the distal end portion 403 from which the arc is emitted during operation. The body portion 402 is comprised of a first ridge portion 405, a channel portion 406 and second ridge portion 407, where the second ridge portion 407 is closest to the distal end of the electrode 400. The channel portion has at least one, and usually more than one, port 410 through which a cooling flow can be passed as described herein. The ports 410 can be seen more clearly in FIG. 4B. In the embodiment shown, the ports 410 are aligned such that their respective centerlines are parallel to an x-y coordinate system centered on the centerline of the electrode 400 (see FIG. 4B). This configuration aids in capturing the swirl flow coming from the swirl ring during operation. This configuration also imparts a swirl to the flow entering the cavity 415 to enhance cooling. In other exemplary embodiments, the centerlines of the respective ports can be aligned with the x-y coordinates of the grid as shown in FIG. 4B such that the gas exits at an angle 90 degrees to the tangent line where the centerline of the port 410 intersects with the outer surface of the electrode 410. Of course, in other exemplary embodiments, the centerlines of the ports 410 can be angled at any angle between 0 and 90 degrees relative to the x-y grid as shown in FIG. 4B, so that the flow exits the electrode at the appropriate angle for a given torch and operation. In the embodiment shown in FIGS. 4A-4C, four ports are used. However, in other embodiments the number of ports can be less, and can be as few as 1, in other embodiments, the number of ports can be in the range of 4 to 6, while in other embodiments, the number of ports can be more than 6.

As shown in FIG. 4B, in some embodiments, the ports 410 can all have the same relative angle to the x-y grid as shown. However, in other exemplary embodiments, a first port can have one angle, while another port can have a second angle. For example, in an embodiment with 4 ports, 2 ports on opposite sides can have a first angle while the remaining 2 ports can have a different angle. The angles can be configured as needed for a given torch construction and performance. Similarly in exemplary embodiments the ports 410 all can have the same cross-sectional shape and dimensions, while in other embodiments, some ports can have a first cross-sectional shape (e.g., circular) while other ports can have a second shape (e.g., elliptical). Similar, in some embodiments, some of the ports can have a first diameter/cross-sectional area, while the other of the ports can have a second diameter/cross-sectional area.

Further, as shown in FIG. 4B, some exemplary embodiments have ports with a constant cross-section along the length of the port. However, in other exemplary embodiments the ports can have a varying cross-section along their length. For example, in some embodiments the ports can have a truncated cone shape, or other shape. For example, in other embodiments, the ports can have Venturi shape. Additionally, like embodiments discussed above, when multiple ports are used, a first number of ports can have a first configuration (e.g., constant cross-section), while other of the ports can have a second configuration (e.g. truncated cone shape).

It is noted that embodiments of the present invention can use ports having any combination(s) of the above features, without departing from the spirit or scope of the present invention. That is, any of the above port attributes can be used for any given torch/operational requirements.

FIG. 4C depicts a cross-section of the electrode 400. As shown, in the upstream portion 401 of the electrode 400 a cavity 415 exists which is open on the upstream end of the electrode 400 and is coupled to the inner openings of the ports 410. As air/gas flows into the cavity 415 from the ports 410 as described previously it flows out of the upstream end of the cavity 415. The cavity 415 has a diameter D and length L1 which ensures appropriate flow from the ports 410. Also, as shown the upstream portion 401 has an outside diameter D2 which is larger than the outside diameter D3 of the distal end portion 403. Further, in some embodiments, the outer diameter of the groove 406 is the same diameter D2 of the upstream portion, while in other embodiments, the outer diameter of the groove portion 406 can be between the diameters D2 and D3, while in some embodiments the outer diameter of the groove 406 can be smaller than D2. The outer diameter D2 of the upstream portion 401 is of a diameter that allows the electrode 400 to be coupled to/inserted into the cathode body. In some embodiments the outer surface is smooth for a press fit type insertion, while in other embodiments threads, or the like, can be used. Further, in some embodiments, the groove portion 406 has a straight surface between ridges 405 and 407, as shown in FIG. 4C, while in other embodiments the surface of the groove portion 406 can have a concave or convex curvature.

Further, as shown, the downstream edge of the ridge 407 is positioned a length L3 from the distal end face of the electrode where the length L3 is less than each of the depth of the cavity 415 L1 and the distance L2 from the distal end face to the distal end face 417 of the cavity 415. Further, as shown, the upstream end face of the ridge 405 is positioned a distance L4 from the upstream end face and a distance L5 from the centerline of the ports 410. In some embodiments, the distance L4 is at least twice the distance L5.

In the embodiment shown in FIG. 4C, each of the ports 410 are positioned the same overall length from the upstream end face of the electrode 400. However, in other exemplary embodiments a first number of the ports can be located at a first distance from the upstream end face and other of the ports can be located at a second distance. This can allow for varying flow patterns and can be configured as needed for a particular torch/operation.

Figure 5:
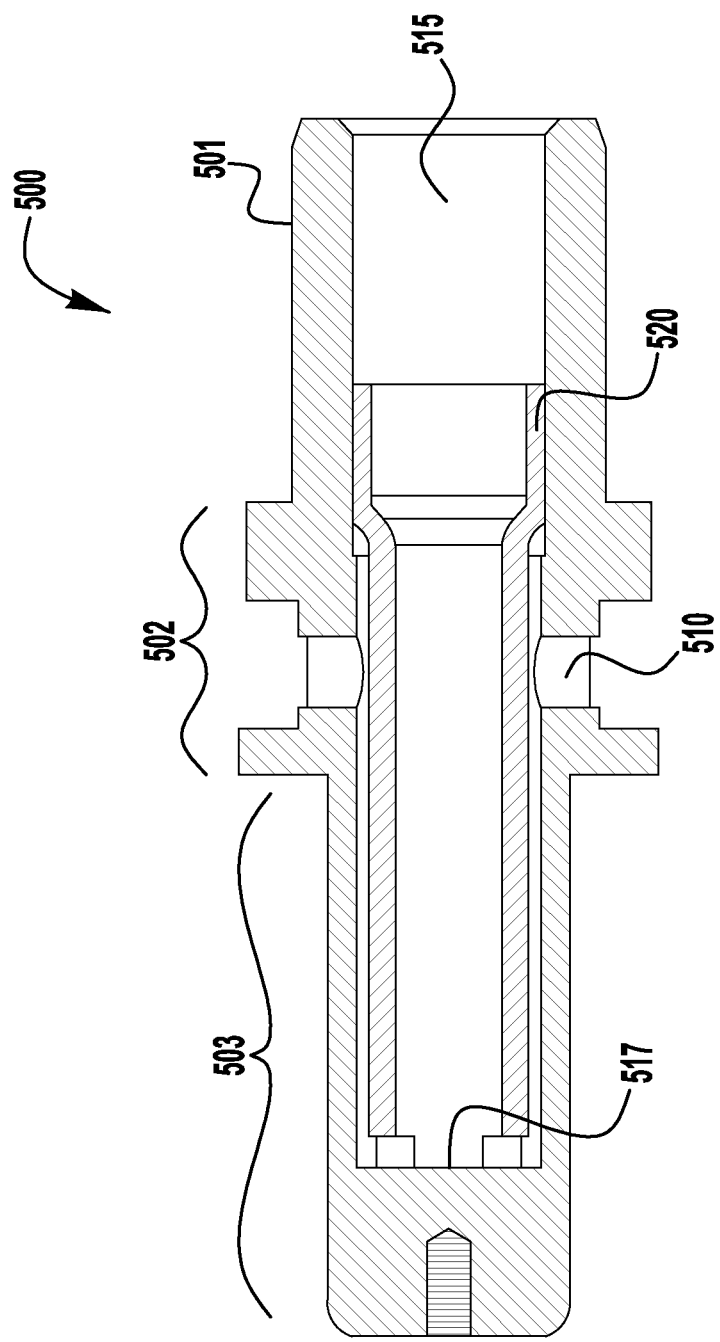
FIG. 5 is a diagrammatical representation of another exemplary embodiment of an electrode of the present invention.

Electrodes of the type described above provide an advantage over known electrodes because they allow for additional cooling of the electrode view the gas/air flow, as well as aid in preventing back flow, via at least one of the ridges FIG. 5 depicts a cross-section of another exemplary electrode 500 having an upstream portion 501, body portion 502 and distal end portion 503 similar to the electrode 400. Additionally, the electrode 500 has a cavity 515, ports 510 and a cavity distal end 517. Other aspects of the electrode 500 are similar to that described in FIGS. 4A to 4C. However, in the electrode 500 an insert 520 is positioned within the cavity 515. In some embodiments the insert 520 can be configured such that a cavity exists between an outer surface of the insert and an inner surface of the cavity 515. This can direct the flow along the cavity wall down towards the distal end of the cavity to aid in cooling. In some exemplary embodiments, this flow then enters the cavity 515 down by the surface 517 and passes to the exit of the cavity. In other embodiments, the insert can have ports that allow at least some of the flow to enter the cavity upstream of the surface 517. As shown, in some embodiments the upstream end of the insert 520 can be configured such that it makes contact with the inner surface of the wall of the cavity 515 to block flow and direct it towards the surface 517 between the insert and the cavity wall as shown.

Figure 6A:
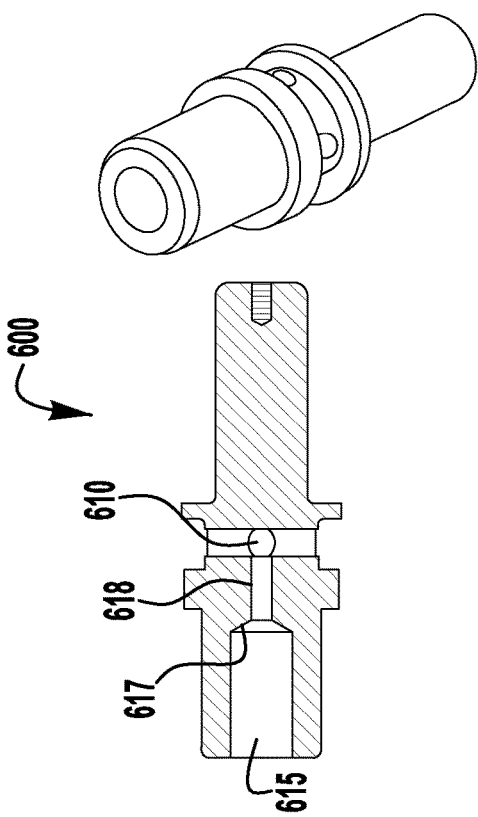
FIGS. 6A-6D are diagrammatical representations of further exemplary embodiments of electrodes of the present invention.

FIGS. 6A through 6D depict further exemplary embodiments of electrodes 600. FIG. 6A depicts an electrode 600 similar to that shown in FIG. 4, except that the cavity 615 has a distal end 617 which is positioned upstream of the position of the ports 610. In this embodiment a channel 618 directs the air/gas to the cavity 615 from the ports 610. In this embodiment, the channel 618 acts as a metering orifice to control the flow of gas/air through the electrode. That is, the channel 618 can be of a size/diameter that provides the desired flow for a given current/operation. In such embodiments, the cavity 615 can be designed to mate with an outlet of a standard cathode body while the channel 618 will be made for a specific operation type (e.g., high current, low current) and thus a user can select the appropriate electrode for a given operation based on the channel size.

Figure 6B:
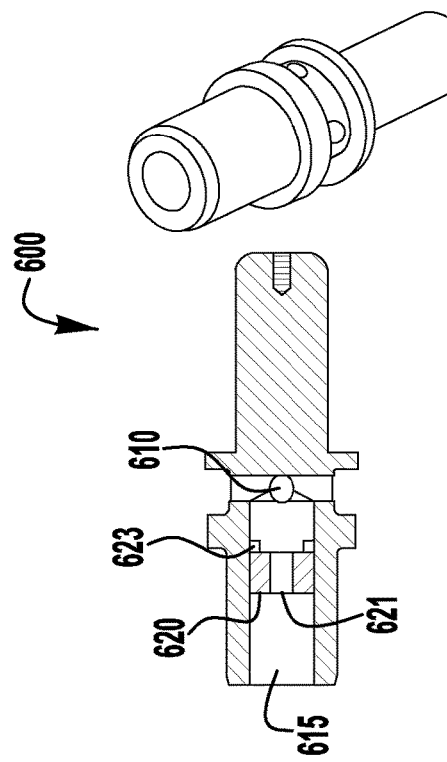

FIG. 6B depicts a further exemplary embodiment, where the cavity 615 has a metering insert 620 with at least one channel 621 through the insert. The channel 621 in the metering insert 620 operates similar to the channel 618 and is used to control the flow of the air/gas through the electrode. In some embodiments, the insert 620 is press fit into the cavity 615 to a desired depth and held in place via friction, while the depth of the insert and the size of the channel can be used to meter the flow. The insert is made separately from the electrode and can be of different material in some embodiments. Further, in some exemplary embodiments the cavity 615 has a shoulder portion 623 against which the insert 620 is abutted to ensure appropriate insertion. In further exemplary embodiments the inner walls of the cavity 615 and the outer surface of the insert 620 can be threaded such that the insert is secured via threads and its relative position can be changed to achieve a desired flow for a given torch/operation.

Figure 6C:
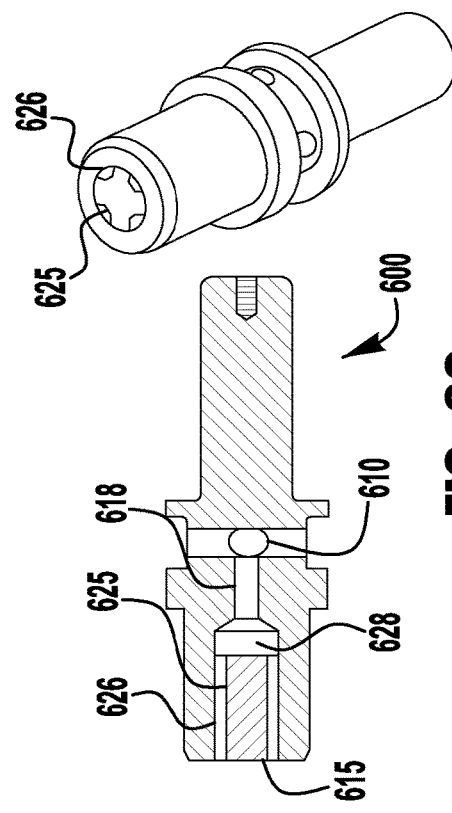

FIG. 6C depicts yet a further exemplary embodiment, where the metering insert 625 is configured such that at least one channel 626 is positioned between an outer surface of the insert 625 and inside wall of the cavity 615. In the embodiment shown four channels 626 are created. In other embodiments, as few as one, or more than four can be created. Further, in the embodiment shown the insert 625 is of a length to allow for the presence of a cavity 628 downstream of the insert 625, whereas in other embodiments this cavity 628 is not present. In some embodiments, each of the channels 626 can be in direct communication with one of the ports. Of course, the shape of the insert 625 is chosen for desired performance in a given operation. Again, the insert can be press fit and or threaded into the cavity 615. Further, as shown the upstream end face of the insert can be flush with the upstream end face of the electrode 600, whereas in other embodiments the upstream end face of the insert 625 can be recessed into the cavity. Further, the upstream end face of the insert can be shaped to control air flow as it exits the channels 626 such as having a curved or conical tip. In fact, in some embodiments the upstream end face of the insert extends upstream of the upstream end face of the electrode and is inserted into the cathode when the cathode and electrode are assembled. Such embodiments can provide a desired flow configuration of the air/gas flow at the wall of the cavity 615 thus increasing the heat transfer from the electrode.

Figure 6D:
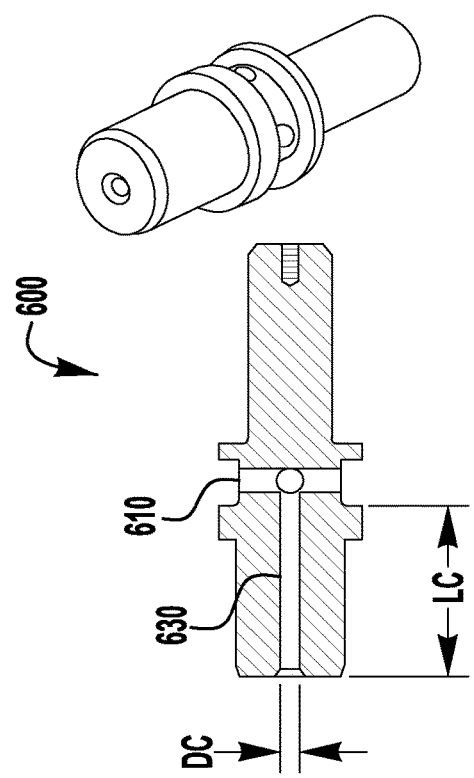

FIG. 6D depicts another exemplary embodiment, where a channel 630 extends from the upstream end face to the ports 610 with a length LC. The channel 630 is of a diameter DC that is sufficient to meter the flow of air/gas as desired for a given operation. In some embodiments, the diameter DC is smaller than the diameter of the ports 610.

FIGS. 8A through 8C depict an exemplary embodiment of a cathode body 800 that can be used with embodiments of the present invention. It is noted that the cathode body 800 shown in FIG. 8 can be the same cathode body 303 as previously discussed herein. The cathode 800 has an upstream portion 810, a body portion 820 and a downstream portion 830. The upstream portion has a connection portion 811, which can be threaded, to allow for securing of the cathode 800 within the torch 300 and which can provide an electrical connection. Downstream of the connection portion is a hole 813 which may or may not pass through the upstream portion 810 to accommodate a set screw, roll pin or the like to prevent rotation of the cathode body. In some embodiments, a diameter step 801 separates the upstream portion 810 from the body portion 820, where the body portion 820 has a larger outer diameter 821 than the upstream portion 810. The body portion 820 contains a collar portion 823 which is used to located and position the cathode within the torch 300. In some exemplary embodiments, the outer diameter 821 upstream of the collar is smaller than the outer diameter 825 downstream of the collar portion 823. As shown, downstream of the body portion 820 is the downstream end portion 830. The downstream end portion 830 has a first portion 831 which contains exit ports 833 which allows air flow to exit the cathode. Downstream of the first portion 831 is a second portion 835, having a larger outer diameter than the first portion 831, which contains a cavity 837 into which flow from the electrode enters during operation. As shown, the ports 833 are in communication with the cavity 837 such that flow from the cavity is directed outside of the cathode 800 via the ports 833. In the embodiment shown 4 ports 833 are used. However, in other embodiments a different number of ports can be used. Also, the sizing and location of the ports 833 can be optimized based on a desired operational performance, to ensure proper flow and cooling. As shown in FIG. 8, in some embodiments the cavity 837 can have a wall with a groove 839 which allows for the use of a multi-lam type of connection to secure the electrode. Of course, other configurations can be used to secure the electrode without departing from the spirit or scope of the present invention.

Therefore, various embodiments of the present invention, provide an improved air cooled, retract type cutting torch which can provide more precision for a longer period of time and a larger number of start cycles.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

We claim:

1. A plasma cutting electrode, said electrode comprising:
an upstream portion;
a gas discharge cavity which is open at an upstream end of said upstream portion;
a body portion downstream of said upstream portion, said body portion comprising a first ridge portion, a second ridge portion, and at least one inlet flow port open to an outer surface of said body portion and positioned between the first ridge portion and the second ridge portion along a section of the body portion having a smaller diameter than either of the first ridge portion and the second ridge portion; and
a distal end downstream of said body portion, said distal end comprising an emitting insert in a distal end face of said distal end;
wherein said at least one inlet flow port is coupled to said gas discharge cavity to allow a gas flow from outside of said body portion into said pas discharge cavity through the at least one inlet flow port.

2. The electrode of claim 1, wherein said body portion comprises a plurality of said inlet flow ports and each of said plurality of said inlet flow ports is coupled to said gas discharge cavity.

3. The electrode of claim 2, wherein each of said plurality of said inlet flow ports are dimensionally the same.

4. The electrode of claim 1, wherein a centerline of said at least one inlet flow port is oriented parallel to an x-y coordinate grid centered on a centerline of said body portion.

5. The electrode of claim 1, wherein a centerline of said at least one inlet flow port is angled between 0 and 90 degrees relative to an x-y coordinate grid centered on a centerline of said body portion.

6. The electrode of claim 2, wherein a centerline of at least one of said inlet flow ports is oriented at a first angle relative to an x-y coordinate grid centered on a centerline of said body portion, and a centerline of at least one other of said inlet flow ports is oriented at a second angle relative to said grid.

7. The electrode of claim 1, wherein said gas discharge cavity further comprises an insert positioned therein and offset from an inner surface of the body portion to direct the gas flow within the cavity.

8. A plasma cutting electrode, said electrode comprising:
an upstream portion;
a gas discharge cavity which is open at an upstream end of said upstream portion;
a body portion downstream of said upstream portion, said body portion comprising a first ridge portion, a second ridge portion, and at least four inlet flow ports open to an outer surface of said body portion and positioned between the first ridge portion and the second ridge portion along a section of the body portion having a smaller diameter than either of the first ridge portion and the second ridge portion; and
a distal end downstream of said body portion, said distal end comprising an emitting insert in a distal end face of said distal end;
wherein said at least four inlet flow ports are coupled to said gas discharge cavity to allow a gas flow from outside of said body portion into said gas discharge cavity through the at least four inlet flow ports.

9. The electrode of claim 8, wherein each of said at least four inlet flow ports are dimensionally the same.

10. The electrode of claim 8, wherein respective centerlines of said at least four inlet flow ports are oriented parallel to an x-y coordinate grid centered on a centerline of said body portion.

11. The electrode of claim 8, wherein a centerline of at least one said at least four inlet flow ports is angled between 0 and 90 degrees relative to an x-y coordinate grid centered on a centerline of said body portion.

12. The electrode of claim 8, wherein a centerline of at least one of said at least four inlet flow ports is oriented at a first angle relative to an x-y coordinate grid centered on a centerline of said body portion, and a centerline of at least one other of said at least four inlet flow ports is oriented at a second angle relative to said grid.

13. The electrode of claim 8, wherein said gas discharge cavity further comprises an insert positioned therein and offset from an inner surface of the body portion to direct the gas flow within the cavity.

14. A plasma cutting electrode, said electrode comprising:
an upstream portion;
a gas discharge cavity which is open at an upstream end of said upstream portion;
a body portion downstream of said upstream portion, said body portion comprising a groove on an outer surface thereof and comprising a plurality of inlet flow ports open to said outer surface of said body portion, where openings of each of said inlet flow ports on said outer surface are positioned within said groove; and
a distal end downstream of said body portion, said distal end comprising an emitting insert in a distal end face of said distal end;
wherein said each of said plurality of said inlet flow ports are coupled to said gas discharge cavity to allow a gas flow from outside of said body portion into said gas discharge cavity through the plurality of inlet flow ports, and
wherein a centerline of at least one of said inlet flow ports is oriented parallel to an x-y coordinate grid centered on a centerline of said body portion.

15. The electrode of claim 14, wherein each of said plurality of said inlet flow ports are dimensionally the same.

16. The electrode of claim 14, wherein said gas discharge cavity comprises an insert positioned therein and offset from an inner surface of the body portion to direct the gas flow within the cavity.

* * * * *